United States Patent
Sen et al.

(10) Patent No.: US 9,674,689 B2
(45) Date of Patent: *Jun. 6, 2017

(54) SYSTEM AND METHOD FOR MITIGATING THE EFFECTS OF INTERFERERS WHILE PERFORMING CONDITIONAL DEVICE SCAN

(71) Applicant: GOOGLE TECHNOLOGY HOLDINGS, LLC, Mountain View, CA (US)

(72) Inventors: Indranil S. Sen, Santa Clara, CA (US); Graham R. Alvey, Skokie, IL (US); Mark R. Braun, Elgin, IL (US); James A. Van Bosch, Crystal Lake, IL (US)

(73) Assignee: Google Technology Holdings, LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/043,862

(22) Filed: Feb. 15, 2016

(65) Prior Publication Data
US 2016/0165429 A1 Jun. 9, 2016

Related U.S. Application Data (63) Continuation of application No. 14/629,230, filed on Feb. 23, 2015, now Pat. No. 9,264,999, which is a
(Continued)

(51) Int. Cl.
*H04W 52/02* (2009.01)
*H04W 8/00* (2009.01)
(Continued)

(52) U.S. Cl.
CPC ............ *H04W 8/005* (2013.01); *H04B 1/713* (2013.01); *H04B 7/26* (2013.01); *H04B 17/318* (2015.01);
(Continued)

(58) Field of Classification Search
CPC .............................. H04W 84/20; H04W 8/005
See application file for complete search history.

(56) References Cited

U.S. PATENT DOCUMENTS 8,571,475 B2 10/2013 Sen et al.
8,965,289 B2 2/2015 Sen et al.
(Continued)

FOREIGN PATENT DOCUMENTS

| | | |
|---|---|---|
| GB | 2422968 A | 8/2006 |
| TW | 200637201 | 10/2006 |
| WO | 2006001331 A1 | 2/2006 |

OTHER PUBLICATIONS

Chinese Office Action of Chinese Patent Application No. 201080036621.5 mailed Feb. 21, 2014; 10 pgs.
(Continued)

*Primary Examiner* — David Bilodeau
(74) *Attorney, Agent, or Firm* — Wolfe-SBMC (57) ABSTRACT

A method, a personal area network device operating as a slave, and a short range communications device operating as a slave are disclosed. A data storage 208 may store at least one protocol-specific channel criterion for a connection with a master short range communication device 104. A short range transceiver 108 may execute a preliminary device scan of a scanning set of communication channels for radio frequency energy. A processor 204 may decide to execute a full device scan based in part on the protocol-specific channel criterion.

20 Claims, 9 Drawing Sheets

Related U.S. Application Data continuation of application No. 14/064,848, filed on Oct. 28, 2013, now Pat. No. 8,965,289, which is a continuation of application No. 12/543,704, filed on Aug. 19, 2009, now Pat. No. 8,571,475.

(51) Int. Cl.

| | | |
|---|---|---|
| *H04B 7/26* | (2006.01) | |
| *H04B 1/713* | (2011.01) | |
| *H04B 17/318* | (2015.01) | |
| *H04L 12/26* | (2006.01) | |
| *H04W 4/00* | (2009.01) | |
| *H04W 24/02* | (2009.01) | |
| *H04W 84/20* | (2009.01) | |

(52) U.S. Cl.
CPC ............ *H04L 43/16* (2013.01); *H04W 4/008* (2013.01); *H04W 24/02* (2013.01); *H04W 52/0209* (2013.01); *H04W 52/0229* (2013.01); *H04W 84/20* (2013.01); *Y02B 60/50* (2013.01)

(56) References Cited

U.S. PATENT DOCUMENTS

| | | |
|---|---|---|
| 9,264,999 B2 | 2/2016 | Sen et al. |
| 2005/0032479 A1 | 2/2005 | Miller et al. |
| 2006/0128308 A1 | 6/2006 | Michael et al. |
| 2006/0142004 A1 | 6/2006 | He et al. |
| 2009/0046763 A1 | 2/2009 | Kerai |
| 2010/0120362 A1 | 5/2010 | Walley et al. |
| 2011/0045771 A1 | 2/2011 | Sen et al. |
| 2014/0057568 A1 | 2/2014 | Sen et al. |
| 2015/0173019 A1 | 6/2015 | Sen et al. |

OTHER PUBLICATIONS

"Final Office Action", U.S. Appl. No. 12/543,704, Oct. 11, 2012, 13 pages.

"Final Office Action", U.S. Appl. No. 14/064,848, Aug. 11, 2014, 6 pages.

"International Search Report and Written Opinion", Application No. PCT/US2010/042512, Oct. 20, 2010, 18 pages.

"Non-Final Office Action", U.S. Appl. No. 12/534,704, Apr. 5, 2012, 9 pages.

"Non-Final Office Action", U.S. Appl. No. 14/064,848, Apr. 25, 2014, 6 pages.

"Non-Final Office Action", U.S. Appl. No. 14/629,230, Aug. 28, 2015, 7 pages.

"Notice of Allowance", U.S. Appl. No. 12/543,704, Mar. 13, 2013, 13 pages.

"Notice of Allowance", U.S. Appl. No. 12/543,704, Jun. 25, 2013, 13 pages.

"Notice of Allowance", U.S. Appl. No. 14/064,848, Oct. 14, 2014, 5 pages.

"Notice of Allowance", U.S. Appl. No. 14/629,230, Oct. 8, 2015, 6 pages.

Jiang, "A Mechanism for Quick Bluetooth Device Discovery", Jan. 1, 2004, 6 pages.

SYSTEM AND METHOD FOR MITIGATING THE EFFECTS OF INTERFERERS WHILE PERFORMING CONDITIONAL DEVICE SCAN

CROSS-REFERENCE TO RELATED APPLICATIONS

The present application is a continuation of U.S. patent application Ser. No. 14/629,230, filed Feb. 23, 2015, presumptive U.S. Pat. No. 9,264,999, entitled "System and Method for Mitigating the Effects of Interferers while Performing Conditional Device Scan," which is a continuation of U.S. patent application Ser. No. 14/064,848, filed Oct. 28, 2013, now U.S. Pat. No. 8,965,289, entitled "System and Method for Mitigating the Effects of Interferers while Performing Conditional Device Scan," which is a continuation of U.S. patent application Ser. No. 12/543,704, filed Aug. 19, 2009, now U.S. Pat. No. 8,571,475, entitled "System and Method for Mitigating the Effects of Interferers while Performing Conditional Device Scan," all of which is incorporated by reference herein for all purposes.

FIELD OF THE INVENTION

The present invention relates to a method and system for creating an ad-hoc personal area network connection. The present invention further relates to performing a conditional device scan to determine if a device is available for connection.

INTRODUCTION

Currently, more and more mobile telephones may use short range communication technology, such as Bluetooth®, to improve functionality and usability. Bluetooth®, and similar technology, may allow a user to create a personal area network, or piconet. The personal area network may be a network that connects multiple devices used by a single user. While the range of a personal area network may generally encompass a single user, multiple users may use the devices of a personal area network simultaneously. An example of a personal area network may be a network that encompasses a mobile telephone, a Bluetooth® headset, and a personal computer or laptop. A wireless personal area network may, by nature, be ad-hoc.

In an active call using Bluetooth®, the impact that Bluetooth® has on the total talk time for the mobile telephone may be minimal as the Bluetooth® active current drain may be a small contributor to the total mobile telephone active current drain. For example, a Bluetooth® component may use 15 mA out of over 200 mA for the entire telephone, a 5% contribution. However, when a telephone is in standby with Bluetooth® on but not actively connected to a Bluetooth® headset, the effect on the phone's standby time may be significant, as much as 30%. This drain may result from searching for a paging signal from a paired Bluetooth® device. An inquiry scan mode current drain may also significantly impact the phone's standby time, when the user selects the "always discoverable" mode, which keeps the phone always in inquiry scan mode.

SUMMARY OF THE INVENTION

A method, a personal area network device operating as a slave, and a short range communications device operating as a slave are disclosed. A data storage may store at least one protocol-specific channel criterion for a connection with a master short range communication device. A short range transceiver may execute a preliminary device scan of a scanning set of communication channels for radio frequency energy. A processor may decide to execute a full device scan based in part on the protocol-specific channel criterion.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, a mobile system, and short range communication device, and other embodiments that relate to the basic concepts of the invention. The short range communication device may be any manner of computer, mobile device, or wireless communication device.

A method, a personal area network device operating as a slave, and a short range communications device operating as a slave are disclosed. A data storage may store at least one protocol-specific channel criterion for a connection with a master short range communication device. A short range transceiver may execute a preliminary device scan of a scanning set of communication channels for radio frequency energy. A processor may decide to execute a full device scan based in part on the protocol-specific channel criterion.

Figure 1:
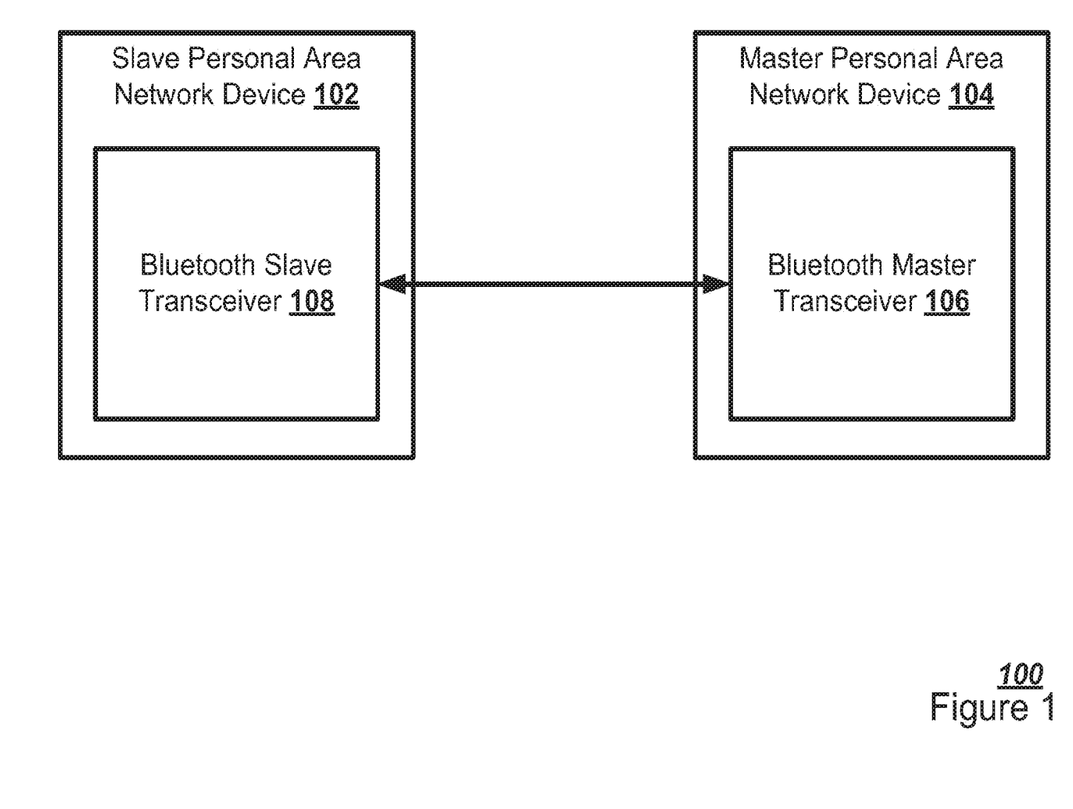
FIG. 1 illustrates in a block diagram one embodiment of a personal area network.

FIG. 1 illustrates in a block diagram one embodiment of a wireless personal area network 100. A first wireless personal area network device, referred to herein as a slave personal area network device 102, may execute a scan of available communication channels, referred to herein as a scanning set of communication channels, for a second wireless personal area network device, referred to herein as the master personal area network device 104, to create a connection between the two devices. The generic scan for a master personal area network device 104 is referred to herein as a device scan. The slave personal area network device 102 may execute a device scan, referred to herein as an inquiry scan, for a previously unknown master personal area network device 104. The slave personal area network device 102 may then be considered paired with the master personal area network device 104. If the connection is severed, the slave personal area network device 102 may execute a device scan for the now known master personal area network device 104, referred to herein as a page scan.

The power consumption of the device scan may be reduced by performing a conditional device scan to determine if a paging signal is present. In a conditional device scan, a slave personal area network device 102 may execute a preliminary device scan for a paging signal before executing a full device scan. The efficiency of the preliminary device scan may be greatly increased by, rather than blindly searching for the presence of radio frequency (RF) energy, the preliminary device scan seeks RF energy that meets one or more protocol-specific channel criteria. For example, by limiting the recognition of the presence of RF energy to those channels of the scanning set of communication channels used by the protocol, referred to herein as a protocol-specific channel subset, the number of false positives caused by environmental RF energy may be greatly reduced. If the preliminary device scan identifies a possible signal from the master personal area network device 102, the slave personal area network device 102 may then execute a full device scan for the master personal area network device 104.

A mobile system may create a short range communication connection, such as a Bluetooth® connection, with a peripheral device, such as a headset, a memory storage device, or other mobile telephone equipment. The mobile system may operate as a slave short range communication device, or slave personal area network device 102, while a peripheral device may act as a master short range communication device, or master personal area network device 104. Alternately, the mobile system may act as a master personal area network device 104 and the peripheral device may act as a slave personal area network device 102. A master Bluetooth® transceiver 106 on the master personal area network device 104 may create a Bluetooth® connection with a slave Bluetooth® transceiver 108 on the slave personal area network device 102.

Figure 2:
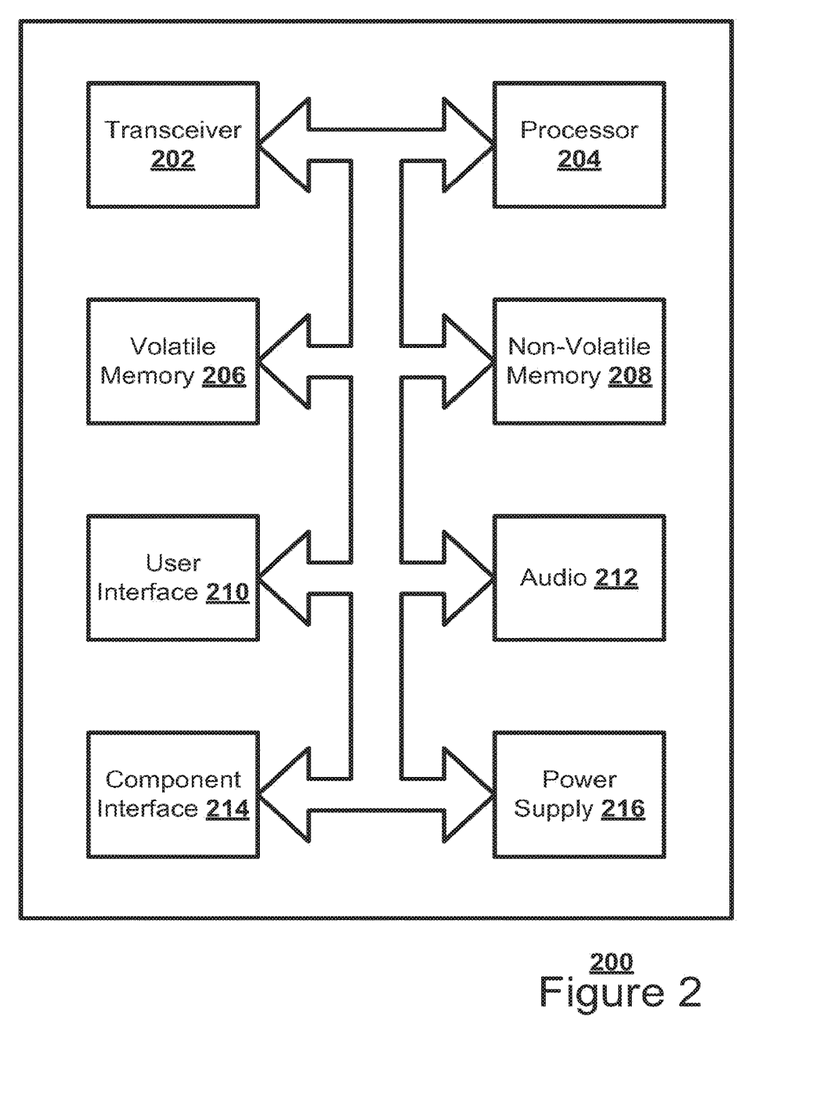
FIG. 2 illustrates in a block diagram one embodiment of a mobile device to pair with a headset.

FIG. 2 illustrates in a block diagram one embodiment of a mobile system 200 or computing device 200 that may be used as a personal area network device, or a short range communication device. The computing device 200 may access the information or data stored in a network device. The computing device 200 may support one or more applications for performing various communications with the network device. The computing device 200 may implement any operating system, such as Windows or UNIX, for example. Client and server software may be written in any programming language, such as C, C++, Java or Visual Basic, for example. The computing device 200 may be a mobile phone, a laptop, a personal digital assistant (PDA), automotive Telematics unit, or other portable device. For some embodiments of the present invention, the computing device 200 may be a WiFi or Bluetooth® capable device. The computing device 200 may include a network interface 202, such as a transceiver, to send and receive data over the network.

The computing device 200 may include a controller or processor 204 that executes stored programs. The controller or processor 204 may be any programmed processor known to one of skill in the art. However, the disclosed method may also be implemented on a general-purpose or a special purpose computer, a programmed microprocessor or microcontroller, peripheral integrated circuit elements, an application-Specific integrated circuit or other integrated circuits, hardware/electronic logic circuits, such as a discrete element circuit, a programmable logic device, such as a programmable logic array, field programmable gate-array, or the like. In general, any device or devices capable of implementing the disclosed method as described herein can be used to implement the disclosed system functions of this invention.

The computing device 200 may also include a volatile memory 206 and a nonvolatile memory 208 to be used by the processor 204. The volatile 206 and nonvolatile data storage 208 may include one or more electrical, magnetic or optical memories such as a random access memory (RAM), cache, hard drive, or other memory device. The memory may have a cache to speed access to specific data. The memory may also be connected to a compact disc-read only memory (CD-ROM), digital video disc-read only memory (DVD-ROM), DVD read write input, tape drive or other removable memory device that allows media content to be directly uploaded into the system.

The computing device 200 may include a user input interface 210 that may comprise elements such as a keypad, display, touch screen, or any other device that accepts input. The computing device 200 may also include a user output device that may comprise a display screen and an audio interface 212 that may comprise elements such as a microphone, earphone, and speaker. A short range transceiver 108 may be connected to the computing device via a component interface 214. The short range transceiver 108 may conform to Bluetooth® protocol. Finally, the computing device 200 may include a power supply 216.

Client software and databases may be accessed by the controller or processor 204 from the memory, and may include, for example, database applications, word processing applications, video processing applications as well as components that embody the disclosed functionality of the present invention. The user access data may be stored in either a database accessible through a database interface or in the memory. The Computing device 200 may implement any operating system, such as Windows or UNIX, for example. Client and server software may be written in any programming language, such as C, C++, Java or Visual Basic, for example.

Figure 3A:
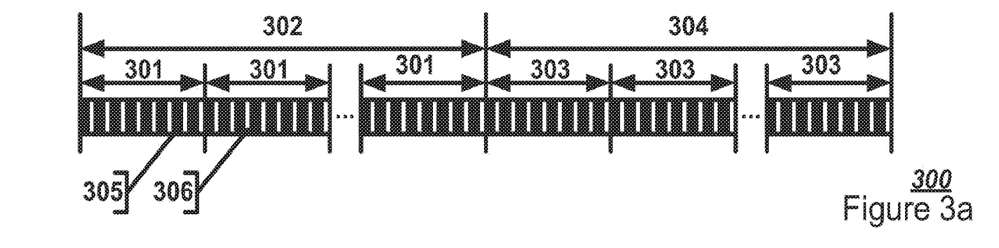
FIGS. 3a-d illustrate timing diagrams for establishing a Bluetooth® connection.

The slave personal area network device 102 may perform a page scan to connect to the master personal area network device 104. FIG. 3a illustrates a timing diagram for the paging operation 300 for a master personal area network device 104. In a normal page scan procedure, the master personal area network device 104 may execute a paging procedure 300. The master personal area network device 104, or paging device, may transmit 16 frequencies in a first hop train 301 and repeat 128 times for a 1.28 second paging train 302, and then another 16 frequencies in a second hop train 303 similarly repeated 128 times for the next 1.28 second paging train 304 in an attempt to find the slave personal area network device 102. The master personal area network device 104 may use a 32 hop pattern. The master personal area network device 104 may use the device address, such as a Bluetooth® device address (BD_ADDR), of the slave personal area network device 102 to determine the page hopping sequence. The master personal area network device 104 may split the page hopping sequence into a first 16 hop train 301 and a second 16 hop train 303 to try and connect faster. The first hop train 302 may contain hops that are closest to where the slave personal area network device 102 is estimated to be. The master personal area network device 104 may estimate the phase of the clock from known information, such as the last encounter or the inquiry procedure.

Figure 3B:
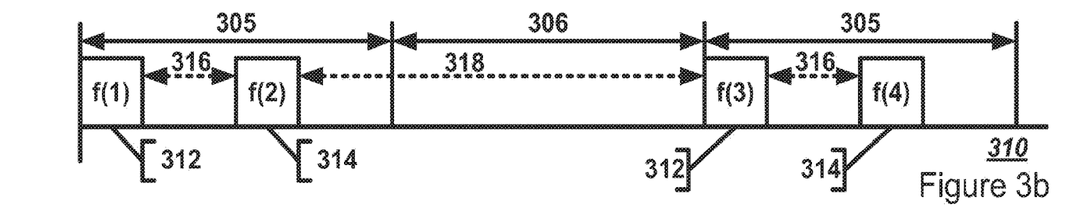

The paging operation may have a transmission slot 305 and a reception slot 306. FIG. 3b illustrates a close up of the slots 310 shown in FIG. 3a. During each transmission slot 305 (corresponding to the dark slots), the master Bluetooth® device may sequentially transmit a first paging burst 312 on a first hop frequency and a second paging burst 314 on a second hop frequency. Subsequent transmission slots 305 may have a first paging burst 312 and a second paging burst using other hop frequencies. An intra-slot delay 316 may occur between two adjacent paging bursts in the same transmission slot 305. An inter-slot delay 318 may occur between two adjacent paging bursts in different transmission slots 305. During each reception slot 306 (corresponding to the blank slots), the master personal area network device 104 may listen to corresponding two hop frequencies.

Figures 3C, 3D:
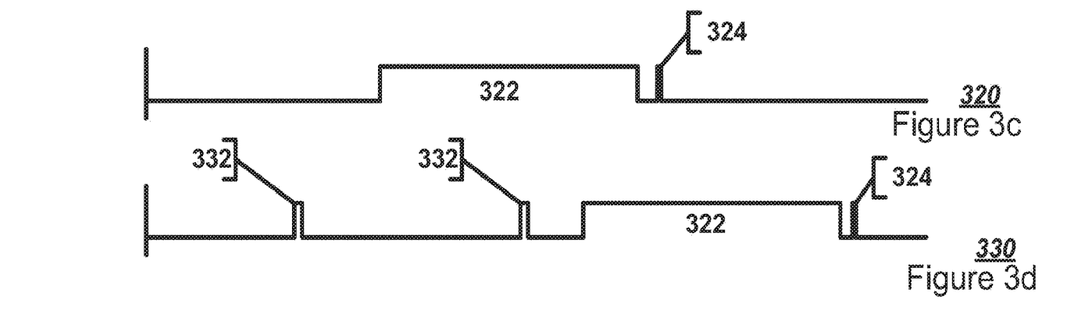

As show in FIG. 3c, the slave Bluetooth® device may perform a normal device scan 320. The slave personal area network device 102 may enter a wakeup period 322 every 1.28 seconds and monitor a frequency to see if the master personal area network device 104 is attempting to connect. The slave personal area network device 102 may continue this procedure until the slave personal area network device 102 receives a page from the master personal area network device 104 and replies appropriately or the procedure is aborted.

The slave personal area network device 102 may detect the master personal area network device 104, at which point the slave personal area network device 102 and the master personal area network device 104 may enter a page response state 324. The slave personal area network device 102 may enter the page response state 324 first by sending the first response. Then the master personal area network device 104 may enter the page response state 324 by sending a frequency hopping selection (FHS) packet. The slave personal area network device 102 may respond with another identifier (ID) packet. During the next slot, both devices may start communicating using a piconet hopping sequence derived from the BD_ADDR of the master personal area network device 104. The master personal area network device 104 may send a "POLL" as the first packet and the slave personal area network device 102 may respond with any type of packet, such as a NULL".

Rather than waste energy by continually performing a full page scan, the slave personal area network device 102 may execute a "conditional device scan" 330, as shown in FIG. 3d. A "conditional device scan" may refer to the generic concept of the slave personal area network device 102 waking up and performing a preliminary device scan 332 of all the available communication channels, referred to herein as the scanning set of communication channels, for the presence of any radio frequency (RF) energy prior to the normal page scan wakeup interval. For example, the scanning set of communications channels may be the 79 Bluetooth® channels. If no radio frequency energy is detected on any of the 79 Bluetooth® channels, the slave personal area network device 102 may opt to omit performing the subsequent full duration device scan 322. A full duration device scan 322 may refer to an 11.25 millisecond scan. The conditional device scan may significantly reduce the average device scan current drain of the slave personal area network device 102. If the slave personal area network device 102 detects energy in the Bluetooth® 2.4 GHz industry, scientific, or medical (ISM) band during the pre-scan 332, then a normal full duration device scan 322 may be performed. The current drain of the phone may be higher if both the preliminary device scan 332 and normal full duration device scan 322 are constantly being triggered. This current drain may be reduced by minimizing false detects in the preliminary device scan 332.

The slave personal area network device 102 may quickly scan the full frequency band over all 79 Bluetooth® channels, or the 2.4 GHz ISM band, for a duration long enough to determine if energy is present on any of the channels, indicating the possible presence of a personal area network device. Using known information about the page and inquiry scan process, the conditional device scan may be enhanced for interference heavy environments. The slave personal area network device 102 may detect RF energy quickly on all 79 Bluetooth® channels, recording received signal strength indication (RSSI) information for the channels for at least 1250 microseconds, or 19 sweeps each lasting about 68 microseconds. RSSI may refer to any indication of RF energy detected in the frequency band.

The slave personal area network device 102 may systematically monitor activity in a subset of frequencies in the ISM band trying to quickly identify the unique full paging or inquiry transmission signature of the master personal area network device 104. The slave personal area network device 102 may use a variety of protocol-specific channel criteria present in the paging signature to differentiate between a paging signal from the master personal area network device 104 and an interference source, such as a wireless local area network (WLAN) or another RF energy source.

The master personal area network device 104 may transmit pages on 32 of the 79 available channels as determined by the Bluetooth® address of the slave personal area network device 102, which is the same subset of the communication channels the slave Bluetooth® device 104 monitors in a full page scan mode. The slave personal area network device 102 may know the master frequency hopping pattern, or sequence. Specifically, the channel over which a page is sent may predetermine the channel over which the next page may be sent. Each page transmission may be about 1 MHz in bandwidth. The duration of the transmit paging burst of the master personal area network device 104 may be 68 microseconds in duration. The time delay between subsequent paging bursts from the master personal area network device 104 may be defined, such as 244.5 microseconds, corresponding to an intra-slot delay 316, or 869.5 microseconds, corresponding to an intra-slot delay 318, for an R1 page scan.

By generating a detection signal to trigger a full device scan based on a specific type of RF activity in the ISM band rather than simply on any form of activity, the number of times a full duration device scan is initiated in an interference environment may be reduced, saving significant standby current drain while still recognizing the paging signature of the master personal area network device 104.

Figure 4:
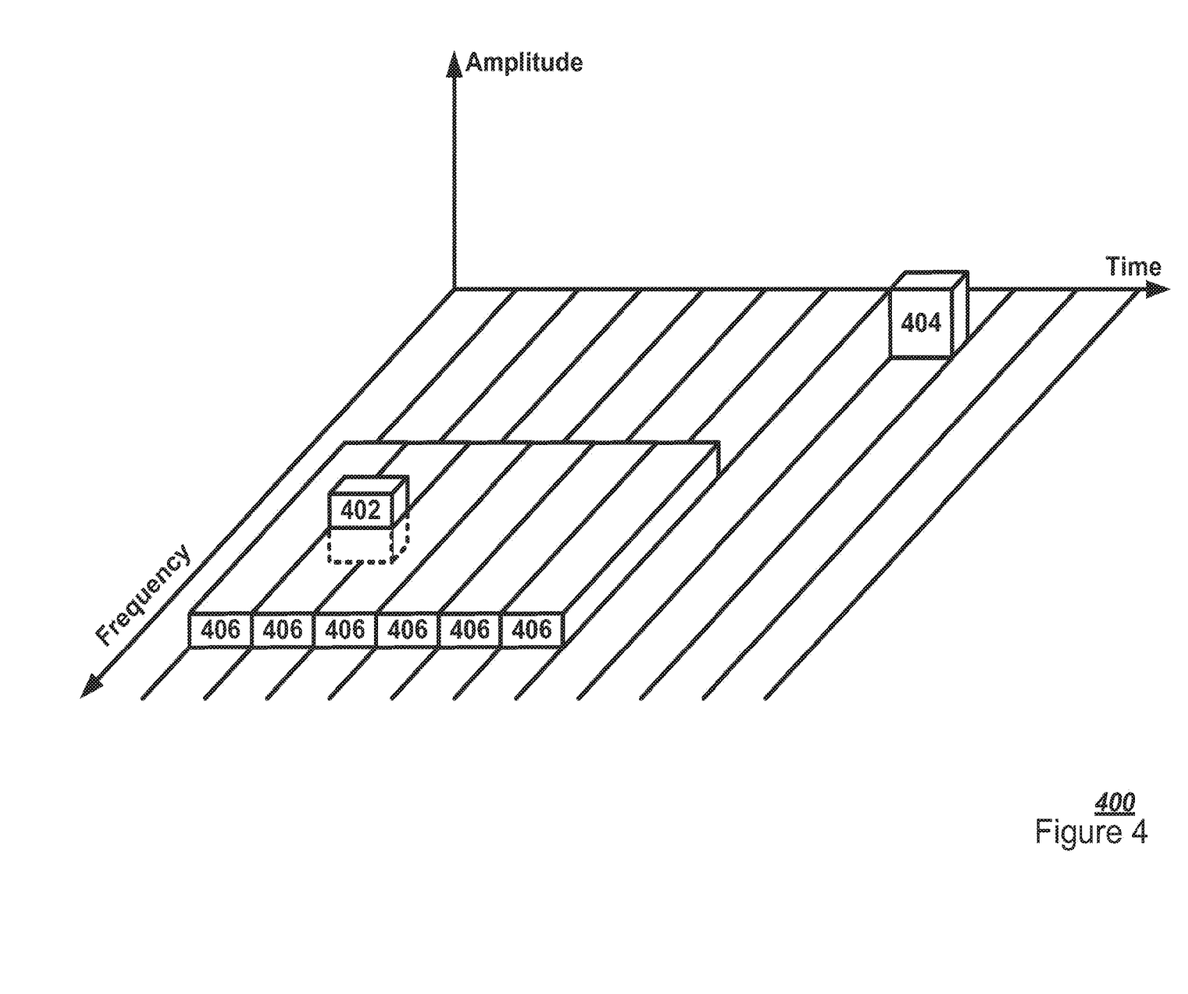
FIG. 4 illustrates, in a Cartesian graph, one embodiment of a first preliminary device scan scenario.

Interferers may result from a variety of sources, as may be shown by a number of preliminary device scan scenarios. FIG. 4 illustrates, in a Cartesian graph, one embodiment of a first preliminary device scan scenario 400. A wideband interferer, such as Institute of Electrical and Electronic Engineers (IEEE) standard 802.11b device, may be present during an initial sweep of the about 19 sweeps of the entire band within the 1250 microsecond preliminary device scan. Due to the presence of 802.11b signal, the RSSI information on multiple frequencies may be higher than the threshold. When multiple frequencies are detected, if a certain frequency has an RSSI which is greater than the RSSI at other detected frequencies, the desired Bluetooth® signal may be present at that frequency. The slave personal area network device 102 may confirm by checking for the presence of energy previous or next to the certain frequency in the page hopping sequence at a delay of either 244.5 usec or 869.5 usec. Depending on the requirement, the slave personal area network device 102 may decide to employ additional finer details of bandwidth and time duration before generating the detection signal. The initial Bluetooth® burst 402 may be on channel49 and the second Bluetooth® burst 404 may be on channel14, 869.5 microseconds later. The first burst 402 may be partially above the 22 MHz wide WLAN 406, distinguishing the first burst 402 from interference by different a RSSI value or amplitude, duration of time for the burst 402, or bandwidth of the burst 402.

Figure 5:
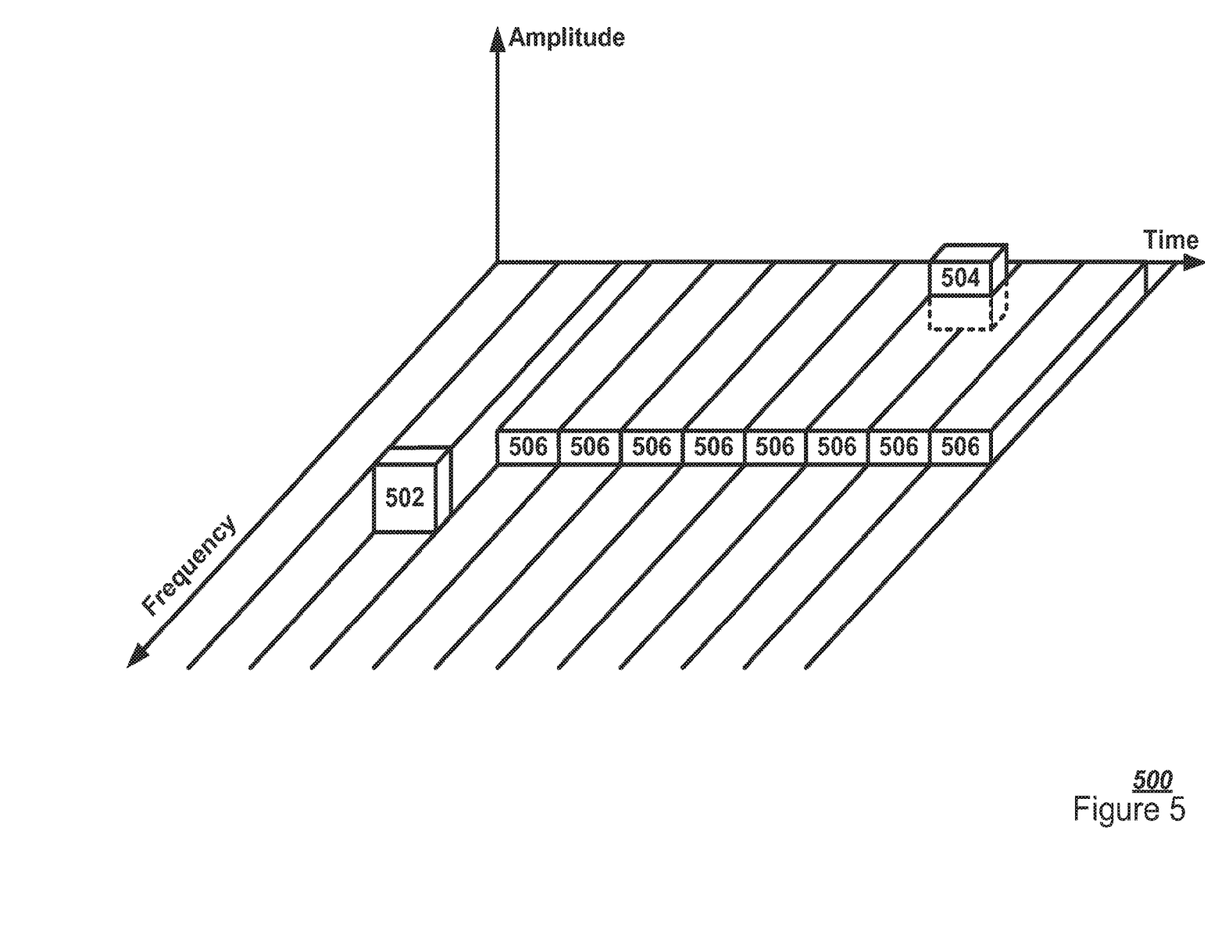
FIG. 5 illustrates, in a Cartesian graph, one embodiment of a second preliminary device scan scenario.

FIG. 5 illustrates, in a Cartesian graph, one embodiment of a second preliminary device scan scenario 500. The slave personal area network device 102 may detect the presence of energy on one 502 of the frequencies present in the page hopping sequence during the initial sweeps. But, following that a wideband interferer may turn "ON" and the slave personal area network device 102 may detect multiple frequencies with RSSI above the threshold in the latter sweeps. As in the previous scenario, the slave personal area network device 102 may look for presence of energy in the channel which is previous or next to a frequency in the page hopping sequence at a delay of either about 244.5 microseconds or 869.5 microseconds. If the slave personal area network device 102 confirms the presence of energy, then the slave personal area network device 102 may generate a detect signal. The initial Bluetooth® burst 502 may be on channel49 and the second Bluetooth® burst 504 may be on channel14, 869.5 microseconds later. The second Bluetooth® burst 504 may be partially above the 22 MHz wide WLAN 506, thus allowing the slave personal area network device 102 to distinguish the second Bluetooth® burst from interference by a different RSSI value or amplitude, duration of time for the burst, or bandwidth of the burst.

In a third scenario, during the initial sweeps, the slave personal area network device 102 may detect a narrowband interferer signal of 1 MHz at channel49, one of the 32 page hopping frequencies of the slave. The slave personal area network device 102 may then look for the presence of energy at channel 14 at a delay of about 244.5 microseconds or about 869.5 microseconds. But, during the later sweeps, a wideband interferer may turn "ON", leading the slave personal area network device 102 to detect RSSI above the threshold at channel14. The slave personal area network device 102 may compare the energy levels of neighboring frequency channels 15 and 16. The slave Bluetooth® device may determine that they have the same RSSI as channel14, meaning the signal detected on channel49 is interference and not the desired Bluetooth® signal. Hence, the slave personal area network device 102 may omit generating the detection signal.

Note that in the above scenarios, the Bluetooth® signal may be presumed to be stronger than the WLAN signal if both are present at the same frequency at the same time. Empirical data suggests that the Bluetooth® device may, in many cases, override the interference present in signal strength given a reasonable spatial separation. However, in a few cases the interferer may be too strong for the Bluetooth® signal, preventing even a normal page scan from working as intended. Furthermore, the slave personal area network device 102 may expect the two Bluetooth® bursts to have nearly identical RSSI values, because during the less than a millisecond lapse in time between the two bursts the RF may not degrade significantly.

A conditional inquiry scan may be similar to a conditional page scan. The slave personal area network device 102 may determine the inquiry mode hopping frequencies by using the general inquiry access code (GIAC). The 32 inquiry frequencies and order may be assumed to be the same, with only the phase in the sequence changing, allowing the use of the same 32 frequencies and order for analysis instead of determining the frequencies and order for each device.

Figure 6:
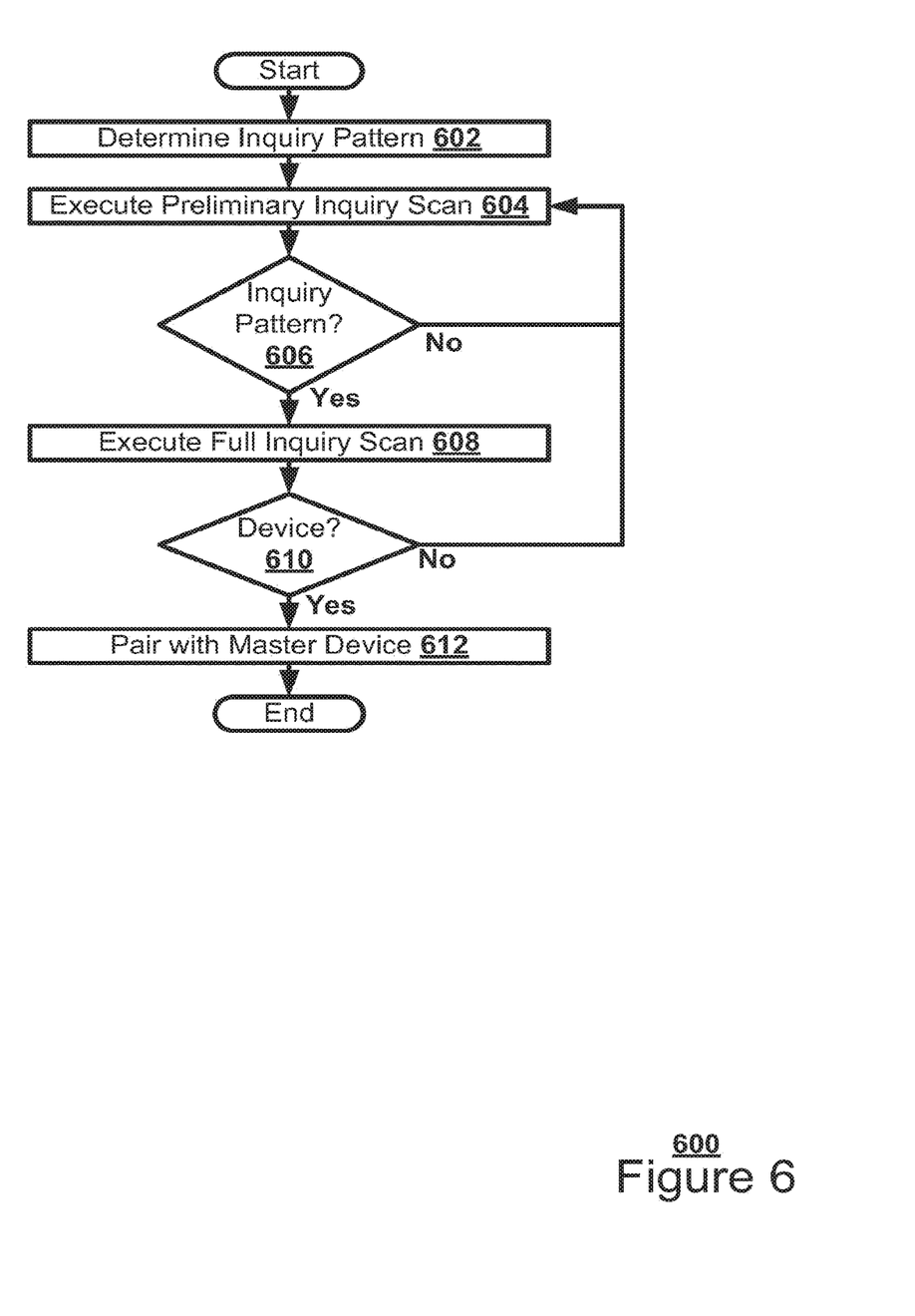
FIG. 6 illustrates, in a flowchart, one embodiment of a method of executing an inquiry scan.

FIG. 6 illustrates, in a flowchart, one embodiment of a method 600 of executing an inquiry scan to initially establish a pairing between the master personal area network device 104 and the slave personal area network device 102. The slave personal area network device 102 may determine an inquiry frequency hopping pattern to be followed on an inquiry scan based on a GIAC (Block 602). The slave personal area network device 102 may execute a preliminary device scan, or preliminary inquiry scan, for RF energy based in part on the inquiry frequency hopping pattern (Block 604). If no inquiry RF energy level is above an energy threshold on an inquiry channel of the inquiry frequency hopping pattern (Block 606), the slave personal area network device 102 may wait until the next preliminary inquiry scan is to be performed (Block 604). If an inquiry RF energy level is above an energy threshold on an inquiry channel of the inquiry frequency hopping pattern (Block 606), the slave personal area network device 102 may execute a full device scan, or full inquiry scan (Block 608). If the slave personal area network device 102 fails to detect a master personal area network device 104 (Block 610), the slave personal area network device 102 may wait until the next preliminary inquiry scan is to be performed (Block 604). If the slave personal area network device 102 detects a master personal area network device 104 (Block 610), the slave personal area network device 102 may pair with the master personal area network device 104 (Block 612).

Figure 7:
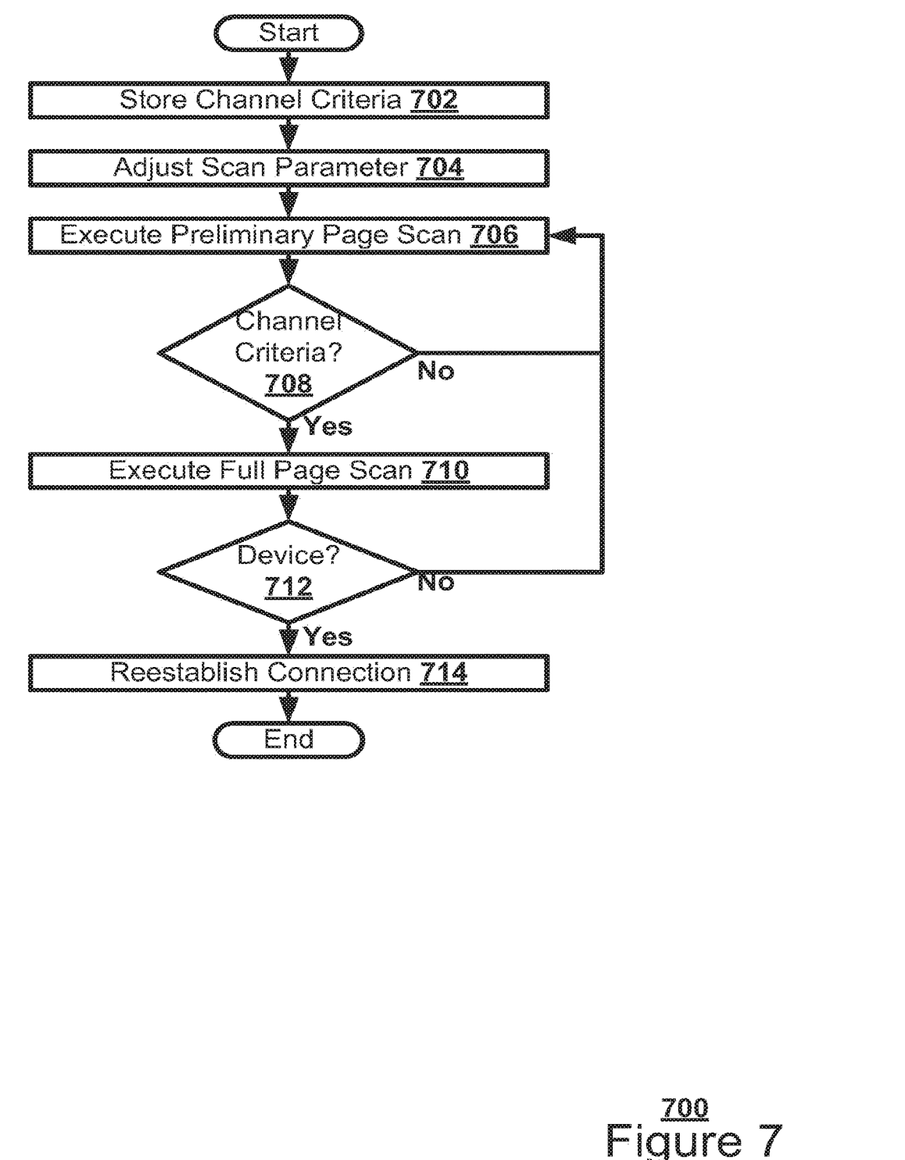
FIG. 7 illustrates, in a flowchart, one embodiment of a method of executing a page scan.

The slave personal area network device 102 may determine the paging mode hopping frequencies by using the BD_ADDR of the slave personal area network device 102. FIG. 7 illustrates, in a flowchart, one embodiment of a method 700 of Executing a page scan to reestablish a Bluetooth® connection between previously paired devices. The slave personal area network device 102 may store one or more channel criterion set during chipset or product design (Block 702). The slave personal area network device 102 may adjust a scan parameter of the preliminary page scan based on scan data collected during an inquiry scan, channel classification data, or a power condition of the slave personal area network device 102 (Block 704). The scan parameter may be a set size of the scanning set of communication channels or the time delay between scanning. For example, the slave personal area network device 102 may reduce the scanning set of communication channels, or the channels scanned during the preliminary page scan, to those channels in the frequency hopping pattern or in the protocol-specific channel subset. The slave personal area network device 102 may execute a preliminary device scan, or the preliminary page scan, for RF energy based in part on the at least one protocol-specific channel criterion (Block 706). If no initial RF energy level on the scanning set of communication channels meets the protocol-specific channel criteria (Block 708), the slave personal area network device 102 may wait until the next preliminary page scan is to be performed (Block 706). If an initial RF energy level burst meets the protocol-specific channel criteria (Block 708), the slave personal area network device 102 may decide to execute a full device scan, or full page scan (Block 710). If the slave personal area network device 102 fails to detect a master personal area network device 104 (Block 712), the slave personal area network device 102 may wait until the next preliminary page scan is to be performed (Block 706). If the slave personal area network device 102 detects a master personal area network device 104 (Block 712), the slave personal area network device 102 may reestablish a connection with the master personal area network device 104 (Block 714).

To generate the detection signal used to initiate a full page scan in a more refined manner, the slave Bluetooth® device may analyze a number of channel criteria to separate interference from the desired Bluetooth® signal or vice versa.

The slave personal area network device 102 may determine a protocol-specific channel subset of a scanning set of communication channels for pairing with a master personal area network device 104. Out of all the scanning set of communication channels, the protocol-specific channel subset may be those channels used by the master personal area network device 102 for a paging signal as determined by the protocol. For example, the paging signal may be on one of 32 Bluetooth® channels as determined by a device address of the slave personal area network device 102, such as the slave BD_ADDR. If the detected energy is not on one of the 32 channels predetermined by the slave BD_ADDR, the detected energy may not be the desired page from the master personal area network device 104. For a Bluetooth®-WLAN combination device the subset of frequencies to be analyzed may be reduced further depending on the channel classification information provided by a WLAN transceiver, such as WLAN access point frequency. The slave personal area network device 102 may decide to execute a full page scan based in part on an initial RF energy level on an initial channel of the protocol-specific channel subset during the preliminary device scan.

The slave personal area network device 102 may determine the frequency hopping pattern for the paging. If the detected energy does not have accompanying energy detection on the next or previous channel in the sequence predetermined by the slave BD_ADDR within a set period, such as 1250 microseconds, the detected energy may not be the desired page from the master personal area network device 104. The slave personal area network device 102 may execute a full page scan based in part on detecting RF energy in sequential channels of the frequency hopping pattern.

The slave personal area network device 102 may determine the frequency bandwidth for the paging signal. If the detected energy occupies greater than a specific frequency bandwidth, such as 1 MHz, the detected energy may not be the desired page from the master personal area network device 104. The slave personal area network device 102 may decide to execute a full page scan based in part on a frequency bandwidth of the detected RF energy.

The slave personal area network device 102 may determine the time duration for the paging signal. If the detected energy lasts for a duration of time longer than a specific duration, such as 68 microseconds, the detected energy may not be the desired page from the master personal area network device 104. The slave personal area network device 102 may decide to execute a full page scan based in part on a time duration of the detected RF energy.

The slave personal area network device 102 may determine the time delay for the paging signal. If two instances of detected energy are separated by a desired amount of time, such as 244.5 microseconds or 869.5 microseconds between subsequent paging bursts for an R1 page scan, the detected energy may be the desired page from the master personal area network device 104. The slave personal area network device 102 may decide to execute a full page scan based in part on a time delay between detected RF energy bursts.

The slave personal area network device 102 may determine the RSSI values for the detected RF energy for two or more paging channels. If the detected energy appears in multiple energy bins with vastly different RSSI values, the detected energy may not be the desired page from the master personal area network device 104, since the level is anticipated to remain relatively constant over duration between paging bursts. The slave personal area network device 102 may decide execute a full page scan based in part on a variance in RSSI values.

By sorting by channel and frequency hopping pattern, the slave personal area network device 102 may minimize the occurrences of false triggers due to interferers during a preliminary device scan. By considering other channel criteria, the slave personal area network device 102 may further improve performance. The slave personal area network device 102 may scan all 79 Bluetooth® channels for 1020 microseconds, to generate a detection signal that triggers a full page scan when energy is detected on two sequential channels from the subset of channels in the desired Bluetooth® signal paging sequence, or two positive detections in sequential order of the subset of 32 out of 79 channels as dictated by the BD_ADDR of the slave Bluetooth® device. The slave personal area network device 102 may adaptively use or discard additional refinements on an as needed basis based on the signal characteristics of the desired Bluetooth® signal to distinguish the signal from the current environment's interference source.

Figure 8:
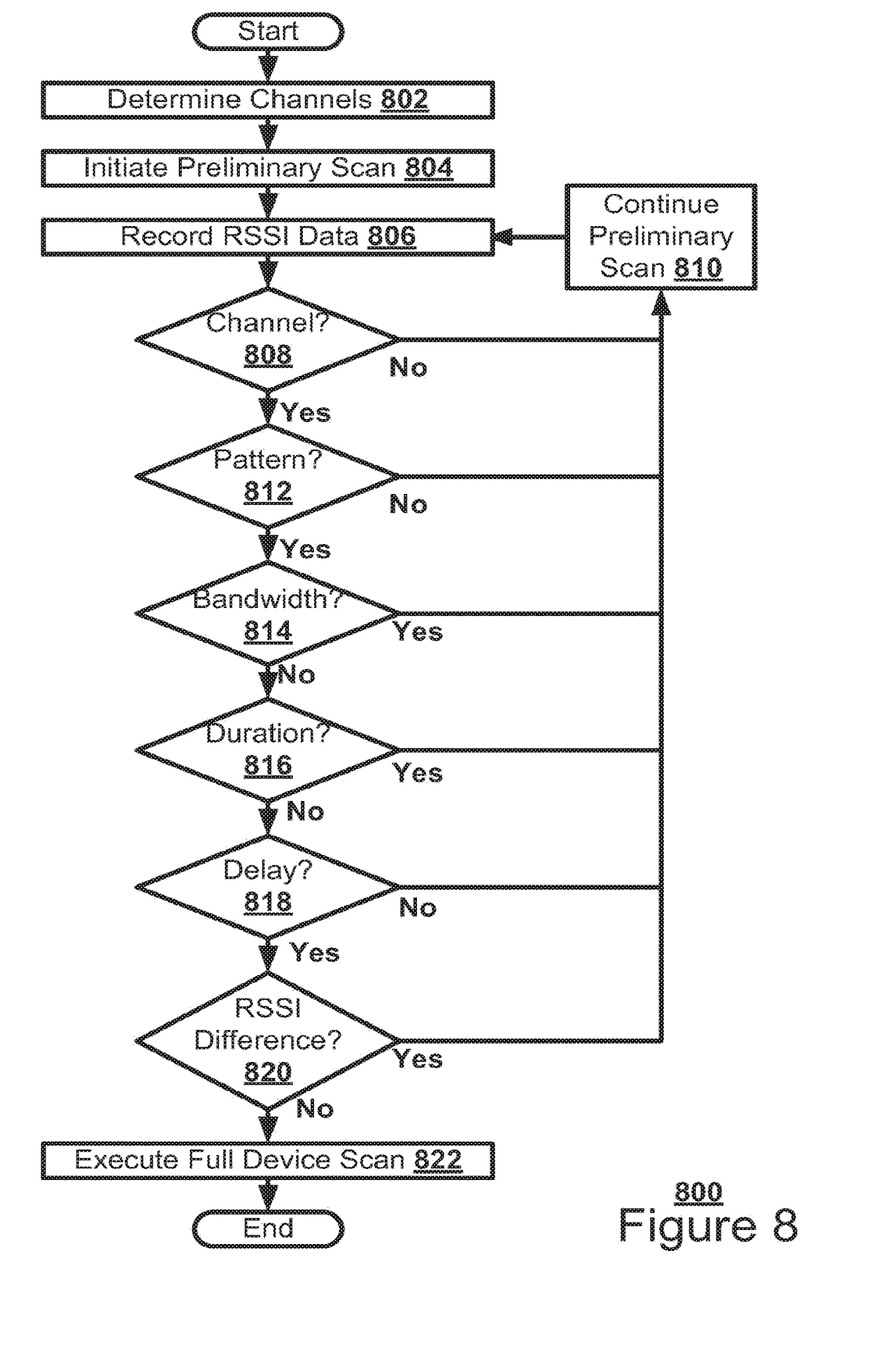
FIG. 8 illustrates, in a flowchart, one embodiment of a method of executing a preliminary device scan using a combinatorial criteria analysis.

FIG. 8 illustrates, in a flowchart, one embodiment of a method 800 of executing a conditional device scan using a combinatorial criteria analysis. The slave personal area network device 102 may determine the protocol-specific channel subset of a scanning set of communication channels the master personal area network device 104 may use for paging and the order of the protocol-specific channel subset (Block 802). The slave personal area network device 102 may determine this information by using the GIAC for inquiry scans or the BD_ADDR of the slave personal area network device 102 for page scans. Nominally, the scanning set of communication channels may be 1 MHz wide with at least a set size of 79, while the protocol-specific channel subset may have a subset size of 32. The slave personal area network device 102 may initiate the preliminary device scan of the scanning set of communication channels (Block 804). The slave personal area network device 102 may record RSSI data for the 79 channels for at least 1250 microseconds (Block 806). The preliminary device scan may execute 19 sweeps each lasting 68 microseconds. The slave personal area network device 102 may omit analyzing one or more of the following channel criteria. If the RSSI data on one of the protocol-specific channel subset of 32 channels in the paging sequence did not exceed a specific RSSI threshold (Block 808), the slave personal area network device 102 may conclude that a paging sequence has not been detected and continue with the preliminary scan (Block 810). If the RSSI data on two sequential channels in the frequency hopping pattern did not exceed a specific RSSI threshold (Block 812), the slave personal area network device 102 may conclude that a paging sequence has not been detected and continue with the preliminary scan (Block 810). If the bandwidth of the detected energy burst exceeds a specific bandwidth, such as 1 MHz (Block 814), the slave personal area network device 102 may conclude that a paging sequence has not been detected and continue with the preliminary scan (Block 810). If the duration of the detected energy burst exceeds a specific duration, such as 68 microseconds (Block 816), the slave personal area network device 102 may conclude that a paging sequence has not been detected and continue with the preliminary scan (Block 810). If the delay between two detected energy bursts does not approximately equal a specific delay, such as 244.5 microseconds or 869.5 microseconds (Block 818), the slave personal area network device 102 may conclude that a paging sequence has not been detected and continue with the preliminary scan (Block 810). If the difference in RSSI values of two detected energy bursts exceeds a specific RSSI threshold (Block 820), the slave personal area network device 102 may conclude that a paging sequence has not been detected and continue with the preliminary scan (Block 810). The slave personal area network device 102 may execute a full device scan if all these criteria are met (Block 822).

In another embodiment, the slave personal area network device 102 may determine the subset of channels to be analyzed when the device is performing both page and inquiry scans. The slave personal area network device 102 may then analyze a subset of channels. The subset of channels may be a combination of 32 page scan frequencies based on the BD_ADDR of the slave personal area network device 102 and the 32 inquiry scan frequencies based on the GIAC. The total number of channels analyzed may be less than 64 channels.

In another embodiment, the information obtained from the conditional device scan may be further used to optimize the parameters of the full duration page or inquiry scan. For example, depending on the frequencies of the detected energy and the Bluetooth® address of the device, the delay between two consecutive page scans may be modified to optimize current drain. If the device is in interlaced scan mode, depending on the frequencies of the detected energy, the device may change the frequencies scanned in the subsequent interlaced page scan interval. For example, if the conditional device scan shows the presence of energy in the second train frequencies, then the slave personal area network device 102 may either omit scanning the first train frequencies or flip the order of the frequency trains during the next interlaced page scan interval.

The slave personal area network device 102 may have a dedicated controller for the conditional device scan, based on the power source of the slave personal area network device 102. If the slave personal area network device 102 is powered through an external power source, such as an alternating current (AC) power supply, the slave personal area network device 102 may operate in a continuous scan mode, such as a RO page scan mode, to connect as soon as possible. RO page scan mode may consume higher current, but external power may balance out the current drain. The conditional device scan may optionally be enabled if the battery level is above a threshold to prevent false triggering from penalizing the slave Bluetooth® device battery life when already in low battery mode.

The slave personal area network device 102 may support adaptive frequency hopping (AFH) when in a connected state. The slave Bluetooth® device may have obtained channel classification information as a master or slave device in another Bluetooth® piconet. A master personal area network device 104 may determine an AFH channel map based on the channel classification information obtained from its own measurements and from the host of the device and from the slave personal area network device 102. A slave personal area network device 102 may obtain classification information from its measurements and from the host of the device. The channels may be classified as good, bad or unknown in the channel map. A master personal area network device 104 may send a channel map to its slave personal area network device 102. The slave personal area network device 102 may reduce the set size of the scanning set of communication channels on the basis of the channel classification information obtained either from the host of the slave personal area network device 102 or from the latest local channel classification stored in the slave personal area network device 102. The slave personal area network device 102 may also reduce the set size of the scanning set of communication channels on the basis of the AFH channel map received from the master of another Bluetooth® piconet. The master may be a master Bluetooth® device or another device.

Figure 9:
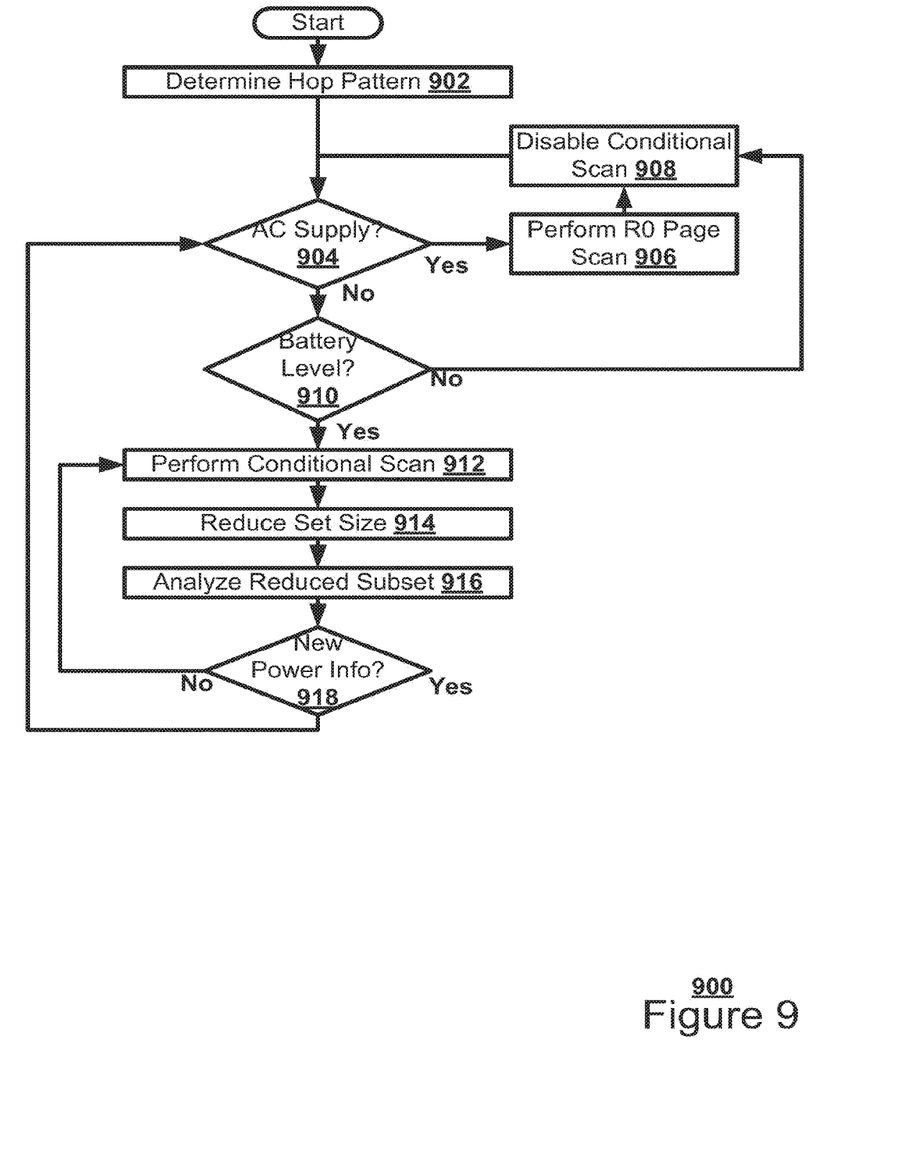
FIG. 9 illustrates, in a flowchart, one embodiment of a method of adjusting a scan parameter for the page scan based on power levels.

FIG. 9 illustrates, in a flowchart, one embodiment of a method 900 of adjusting a scan parameter of the page scan based on a power condition of the slave personal area network device 102. The slave personal area network device 102 may determine the page scan frequency hop pattern based on the BD_ADDR of the slave personal area network device 102 (Block 902). If the slave personal area network device 102 is powered through an AC supply (Block 904), the slave personal area network device 102 may perform an RO page scan (Block 906) and disable the conditional device scan for a predefined amount of time (Block 908). If the slave personal area network device 102 is not powered through an AC supply (Block 904), and the battery level is insufficient for a conditional device scan (Block 910), the slave personal area network device 102 may disable the conditional device scan for a predefined amount of time (Block 908). The slave personal area network device 102 may perform a conditional device scan (Block 912). The slave personal area network device 102 may reduce the set size of the scanning set of communication channels (Block 914). The slave personal area network device 102 may analyze the information of the reduced subset of frequencies to configure a page scan or an inquiry scan (Block 916). If the slave personal area network device 102 receives no new information on the power source 216 of the slave personal area network device 102 (Block 918), the slave personal area network device 102 may continue to perform a conditional device scan (Block 912).

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

The invention claimed is:

1. A wireless communication device, comprising:
a data storage device configured to store at least one protocol specific channel criterion for a connection with a second wireless communication device;
a short range transceiver configured to execute a preliminary scan of a set of communication channels to detect radio frequency energy associated with the second wireless communication device; and
a processor configured to execute a full scan of the set of communication channels based in part on the protocol-specific channel criterion, wherein the protocol-specific channel criterion comprises a detected variance in received signal strength indication (RSSI) of proximate energy bursts.

2. The wireless communication device of claim 1, wherein the short range transceiver is configured to conform to a Bluetooth® protocol.

3. The wireless communication device of claim 1, wherein the processor is configured to execute the full scan of the set of communication channels based in part on a detected radio frequency energy level on sequential channels of a frequency hopping pattern.

4. The wireless communication device of claim 1, wherein the processor is configured to execute the full scan of the set of communication channels based in part on whether the variance in RSSI exceeds an RSSI threshold.

5. The wireless communication device of claim 1, wherein the processor is configured to execute the full scan of the set of communication channels based in part on a detected variance in RSSI on one of the set of communication channels.

6. The wireless communication device of claim 1, wherein the full scan comprises a page scan or an inquiry scan.

7. The wireless communication device of claim 1, wherein the processor is configured to execute the full scan of the set of communication channels based in part on a frequency bandwidth of the detected radio frequency energy.

8. The wireless communication device of claim 7, wherein the frequency bandwidth of the detected radio frequency energy comprises a frequency bandwidth of approximately 1 megahertz (MHz).

9. The wireless communication device of claim 1, wherein the processor is configured to execute the full scan of the set of communication channels based in part on a time delay between the energy bursts.

10. The wireless communication device of claim 9, wherein the time delay between energy bursts comprises a time delay of approximately 68 microseconds ($\mu s$).

11. The wireless communication device of claim 1, wherein the wireless communication device comprises one of a mobile electronic device and a peripheral electronic device, and wherein the second wireless communication device comprises one of a mobile electronic device and a peripheral electronic device.

12. A method, comprising:
selecting a plurality of protocol-specific channels via a first communication device to perform a preliminary scan for a second communication device, wherein the plurality of protocol-specific channels comprises a subset of a set of communication channels utilized to couple the first communication device to the second communication device;
performing the preliminary scan of the set of communication channels to detect electromagnetic energy associated with the second communication device; and
performing a full scan based at least in part on a protocol-specific criterion associated with coupling the first communication device to the second communication device, wherein the protocol-specific criterion comprises a detected variance in received signal strength indication (RSSI) of proximate energy bursts.

13. The method of claim 12, wherein selecting the plurality of protocol-specific channels comprises selecting one or more communication channels previously utilized to pair the first communication device with the second communication device.

14. The method of claim 12, wherein the protocol-specific criterion comprises a detected electromagnetic energy level on sequential channels of a frequency hopping pattern.

15. The method of claim 12, wherein performing the full scan based at least in part on the protocol-specific criterion comprises performing the full scan based on a frequency bandwidth of the detected electromagnetic energy.

16. The method of claim 12, wherein performing the full scan based at least in part on the protocol-specific criterion comprises performing the full scan based on a time delay between the energy bursts.

17. The method of claim 12, wherein performing the full scan comprises reestablishing a previous pairing between the first communication device and the second communication device.

18. A non-transitory computer-readable medium having computer executable code stored thereon, the code comprising instructions to:
cause a processor of a first wireless communication device to execute a preliminary scan of a plurality of wireless communication channels to detect radio frequency (RF) energy associated with a second wireless communication device, wherein the preliminary scan is configured to detect RF energy corresponding to a wireless protocol criterion; and
cause the processor to execute a full scan of the plurality of communication channels based in part on whether the detected RF energy corresponds to the wireless protocol criterion, wherein the wireless protocol criterion comprises a variance in received signal strength indication (RSSI) of proximate energy bursts.

19. The non-transitory computer-readable medium of claim 18, wherein the code comprises instructions to cause the processor to execute the preliminary scan prior to executing the full scan to decrease power consumption when coupling the first wireless communication device to the second wireless communication device.

20. The non-transitory computer-readable medium of claim 18, wherein the code comprises instructions to cause the processor to execute a preliminary scan of a subset of the plurality of wireless communication channels, wherein the subset comprises 32 channels of a full set of 79 channels.

* * * * *